Oct. 21, 1958  H. J. MACKWAY  2,857,097
SYNCHRONIZING OVERTRAVEL MECHANISM
Filed Oct. 3, 1955
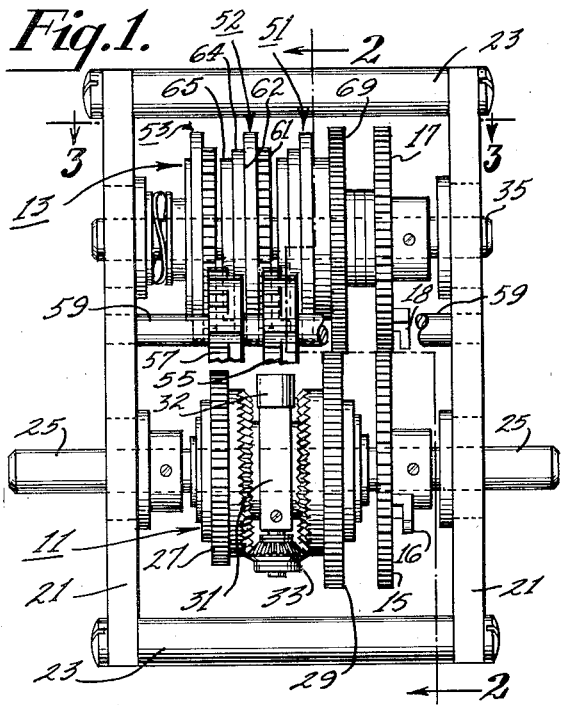
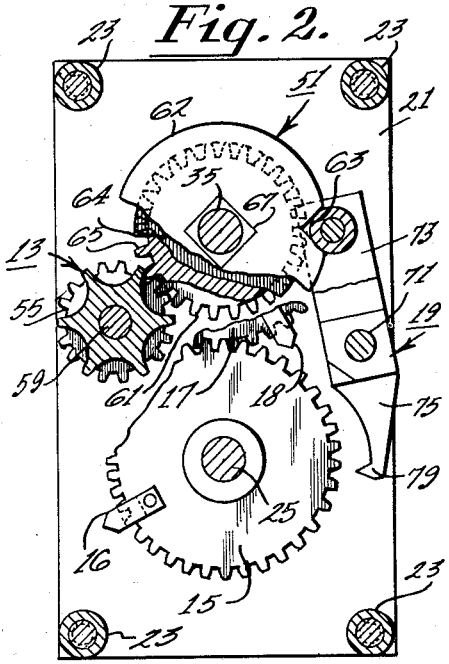
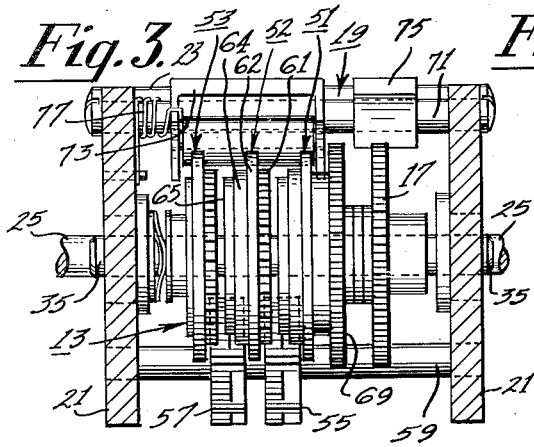
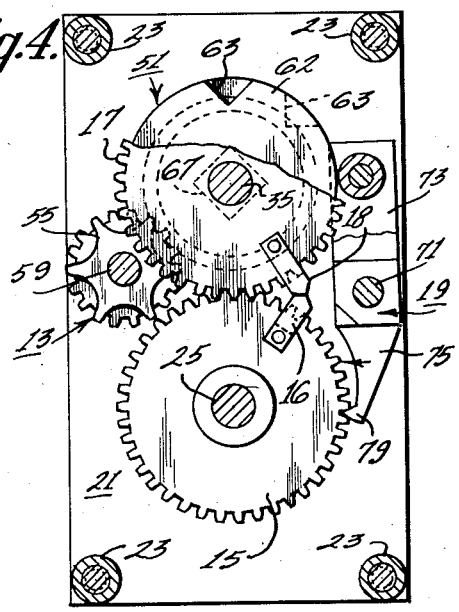
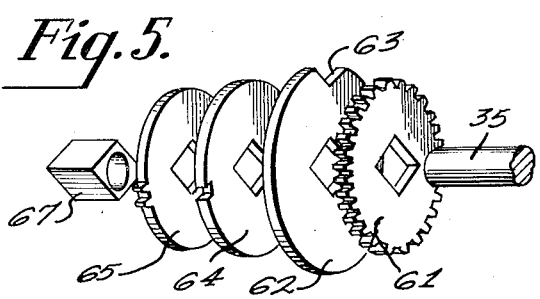
INVENTOR.
Harold J. Mackway
BY
Morris L. Rabkin
ATTORNEY.

United States Patent Office 2,857,097
Patented Oct. 21, 1958

2,857,097

SYNCHRONIZING OVERTRAVEL MECHANISM

Harold J. Mackway, Haddon Heights, N. J., assignor, by mesne assignments, to the United States of America as represented by the Secretary of the Air Force Application October 3, 1955, Serial No. 537,995

5 Claims. (Cl. 235—1)

This invention relates to a synchronizing overtravel mechanism, and more particularly to a mechanism which provides a limited angular output displacement for a greater angular input displacement and which provides for self-synchronization when the input is reversed to take up the excess angular displacement.

In certain types of mechanical apparatus it is desirable to provide an overload mechanism which permits unlimited rotation of an input member with respect to an output member when an overload is produced in the output. It is further desirable to provide a mechanism which will permit excess rotation of an input member with respect to a primary output member which has limited rotation, which will divert the excess rotation to a secondary output member, and which will measure and remember the amount of excess input rotation diverted. It is further desirable to provide a mechanism which will maintain index or synchronization between an input and a primary output member, and which, also, permits overtravel of the input member with respect to the output member, with temporary loss of index at overtravel.

In certain types of mechanisms, such as analog computers, it is desirable to provide a mechanism which will divide an input rotation into two distinct output rotations and which will divert the input rotation from a primary output rotation to a secondary output rotation without losing permanent synchronism between the input rotation and the primary output rotation. A particular use of such a device is to operate coarse and fine systems such as may be employed in analog computers in distance computation. In this use, the primary output may be furnished to a fine potentiometer, having a limited number of turns, used for exceptionally accurate short range computation. The input rotation or the secondary output rotation may be furnished to a coarse potentiometer used for the long range computation. With this device coarse and fine potentiometer signals may be used either concurrently or consecutively. The mechanism may further be used to provide the switch actuation motion at transfer from fine to coarse operation and vice versa.

An object of this invention is to provide an improved overtravel mechanism wherein the amount of overtravel is measured within the range of overtravel desired.

Another object of this invention is to provide an improved overtravel mechanism wherein an input member and an output member, initially synchronized, may be displaced by overtravel, and wherein the members will be automatically re-synchronized when the overtravel is removed by the reverse rotation of the input member.

A further object of this invention is to provide a mechanism which will receive unlimited rotational input and which will convert the input to a limited rotational primary output with means for accepting unlimited overtravel of the input.

A still further object of this invention is to provide a mechanism which accepts an unlimited rotational input, synchronizes the input with a limited rotational primary output, provides for limited overtravel of the input, and automatically re-synchronizes the input with the primary output when their relative rotational positions are regained.

The novel features of the invention, as well as additional objects and advantages thereof, will be understood more fully from the following description when read in connection with the accompanying drawing, in which:

Figure 1 is a view in front elevation of an overtravel mechanism in accordance with the present invention;

Figure 2 is a sectional view in side elevation, partially broken away, taken along the line 2—2 of Figure 1 looking in the direction of the appended arrows;

Figure 3 is a sectional view in plan, taken along the line 3—3 of Figure 1 looking in the direction of the appended arrows;

Figure 4 is a view similar to Figure 2 illustrating a different phase of the operation of the mechanism; and Figure 5 is an exploded view of a portion of the revolution counter mechanism.

Referring now in more detail to the accompanying drawing, an overtravel mechanism includes a differential gearing assembly 11 which is coupled to a rotational input through a gear 27 and which separates the input rotation into two rotational outputs. A primary rotational output includes a cage 31 and a shaft 25. A secondary rotational output includes a gear 29 which is coupled to a counting mechanism 13. The primary output is coupled to a limit mechanism comprising meshing limit gears 15 and 17 having stop lugs 16 and 18 respectively. A double acting latch mechanism 19 is associated with the counting mechanism 13 and the primary output limit mechanism in such manner as to alternately engage either one or the other of these mechanisms thereby locking either the primary or the secondary output against rotation.

The overtravel mechanism is mounted in a housing which comprises bearing plates 21 and spacer bars 23. The differential gearing mechanism 11 is carried on a shaft 25 and comprises the input gear 27, the output gear 29, and the cage 31 which carries an idler gear 33, the idler gear meshing with the input and output gears. The cage 31 is rigidly attached to the shaft 25 by means of a set screw 32, for example, and these members form the primary output of the mechanism. The input gear 27 and the output gear 29 are rotatably mounted with respect to the shaft 25. The output gear 29 forms the secondary output of the mechanism.

The limit gear 15 is rigidly fixed to the shaft 25 and the limit gear 17 is mounted for rotation on a shaft 35 which is mounted parallel to the shaft 25. The limit gears 15 and 17 are provided respectively with stop lugs 16 and 18 which are positioned to interfere with each other. Each of the lugs is mounted on the face of its respective gear adjacent the periphery of the gear. The limit gears 15 and 17 are provided with a different number of teeth. For example, the gear 15 may have forty teeth and the gear 17 may have forty-two teeth. With this arrangement, from a position where the lugs of the meshing gears interfere with each other, the gear 15 will rotate substantially twenty revolutions before the lugs again interfere with each other. Additional lugs placed on either gear will produce lesser number of rotations of the gears 15 and 17. The primary output shaft 25, to which the limit gear 15 is attached, may then be limited to twenty revolutions or less, if desired, in one direction from a starting or index point, or to ten revolutions or less, if desired, in either direction from an intermediate starting or index point.

The counting mechanism 13 is comprised of three cam units 51, 52, and 53 which are adapted to be actuated progressively in the order indicated by their reference numerals. Each of the cam units constitutes one member of an interrupted gear movement or counter which is made up of five members, namely the three cam units and two pinions 55 and 57. The pinions 55 and 57 are mounted for rotation on a shaft 59 and are disposed between the cam units. A complete cam unit 52, for example, is made up of four elements which are particularly illustrated in Figure 5. These elements include a full toothed gear 61, a cam 62 having a notch 63 in its periphery, a notched spacing disc 64 having a notch in its periphery and a two toothed gear 65. In order to form these elements into a unitary rotating assembly, the elements may each be provided with a rectangular center aperture adapted to engage a sleeve 67 having a rectangular outer surface. The sleeve 67 may be rotatably mounted on the shaft 35 or keyed to the shaft. The pinions 55 and 57 are identical and each is comprised of a full toothed portion and a locking portion wherein intermittent teeth of the pinion are removed.

The first cam unit 51 is fixed to the shaft 35 and is driven by means of this shaft. For this reason a full toothed gear 61 is not included in the first cam unit. Remaining cam units 52 and 53 are mounted for rotation with respect to the shaft 35. Since the cam unit 53 is the last in the series, in the illustrated embodiment, it is not provided with a spacing disc 64 or a two toothed gear 65. Additional cam units and pinions may be added to increase the range of the secondary output.

In the operation of the counting mechanism, the spacing disc 64 of a first cam unit 51 engages the locking portion of the pinion 55. The two toothed gear 65 of the first cam unit engages the full toothed portion of the pinion 55 as does the full toothed gear 61 of the succeeding cam unit 52. As the first cam unit 51 rotates, the pinion 55 is prevented from rotating since it is locked against the peripheral surface of its spacing disc 64. When its two toothed gear 61 engages the pinion 55, the pinion is rotated an angular distance equivalent to three teeth and the full toothed gear 61 of cam unit 52, meshing with the pinion, is rotated an equivalent distance as is its associated cam unit 52. The notch provided in the spacing disc 64 receives a tooth on the intermittent portion of the pinion 55 and permits the pinion to rotate. For each revolution of one cam unit, then, the succeeding cam unit is rotated a small distance, one tenth of one revolution for example. If it is assumed that for each revolution of one cam unit the succeeding cam unit will be rotated one tenth of a revolution, the illustrated counting mechanism 13 will count 100 revolutions of the first cam unit 51 before the notches 63 are again aligned.

A gear 69 is rigidly fixed to the shaft 35 and meshes with the output gear 29. Hence the counter mechanism 13 is driven by the output gear 29 through the gear 69 and the shaft 35.

All of the cams 62 are of the same diameter. When the counting mechanism 13 is positioned at its zero or index position, the cams 62 are positioned so that their notches 63 are aligned in a direction parallel with the axis of rotation. The latch mechanism 19 comprises a shaft 71, a cam follower 73 and an arm 75. The cam follower 73 and the arm 75 are rigidly attached to the shaft 71. The shaft 71 is pivotally mounted in the housing and lies parallel to the shaft 35 which carries the counting mechanism. The cam follower 73 rides against the peripheries of the cams 62 and is received within the notches 63 only when the notches are all aligned. The shaft 71 is normally biased by means of a torsion spring 77 for rotation in a direction such that the cam follower 73 is continuously urged against the peripheries of the cams 62, and into the notches 63 when they are aligned.

The arm 75 is provided with a detent 79 which engages the limit gear 15. When the cam follower 73 is received within the notches 63 of the cams 62, the arm 75 is positioned away from the gear 15 to permit rotation of the limit gears 15 and 17. When the cam follower 73 is disengaged from the notches 63 and is riding on the peripheries of the cams 62, the arm 75 is positioned so that the detent 79 engages the teeth of the limit gear 15. The gear 15 is then locked against rotation, as is the shaft 25 and the cage 31 of the differential gearing 11, to lock the primary output.

The operation of the mechanism will now be described. When the mechanism is set up to begin operation, the limit gears 15 and 17 are oriented to permit a desired number of revolutions of the primary output shaft 25 in either one or both directions before the lugs 16 and 18 will engage each other. The counting mechanism 13 will be set at its index or starting position wherein the notches 63 of the cams 62 are aligned and the cam follower 73 is seated in the notches 63. The cam follower is held in the notches 63 by means of the biasing spring 77 to lock the counting mechanism against rotation. The follower 73 will be dislodged from engagement with the notches 63 when a sufficient rotational force or torque is applied to the counting mechanism to overcome the force of the spring 77. Since the counting mechanism is locked against rotation, the shaft 35 and the gear 69 are also locked against rotation as is the output gear 29 which meshes with the gear 69.

Assume now that the input gear 27 rotates in a counter-clockwise direction about the shaft 25, the counter-clockwise rotation being with reference to the shaft 25 as it is illustrated in Figures 2 and 4. As the gear 27 rotates, the idler gear 33 is rotated between the input and output gears 27 and 29 and rotates the cage 31 in the same direction as the input gear 27 but at a different rate. The cage 31, being fixed to the shaft 25, rotates the shaft 25 and the limit gear 15 in a counter-clockwise direction, with reference to Figures 2 and 4. The limit gears 15 and 17, meshing with each other, will then rotate until the interference lugs 16 and 18 engage each other and prevent further rotation of the limit gears in this direction. This condition is illustrated in Figure 4.

When the above described condition occurs, the shaft 25 and consequently the cage 31 are locked against further rotation in their initial direction. If it is assumed now that the input rotational force or torque is sufficient to overcome the force of the biasing spring 77, the input force will be transferred through the idler gear 33 from the input gear 27 to the output gear 29. The output gear 29 drives the gear 69 which is directly coupled to the cam unit 51 of the revolution counter 13. Rotation of the cam unit 51 immediately forces the cam follower 73 out of its notch 63, and consequently out of all of the notches 63, to ride on the peripheral surfaces of the cams 62. When the cam follower 73 is forced out of the notches 63, the latch mechanism shaft 71 is rotated about its axis and the detent 79 engages the teeth of the limit gear 15 to prevent rotation of this gear. The gear 15, and hence the primary output shaft 25, is now locked against rotation in either direction. The cam follower 73 is now riding on the peripheral surfaces of the cams 62 and maintains the detent 79 in engagement with the teeth of the gear 15.

The moment that the cam follower 73 is urged out of engagement with the notches 63, the counting mechanism 13 begins to count the revolutions of the shaft 35 and gear 69, and may also count the revolutions of the output gear 29 if it is assumed that the gears 29 and 69 have the same number of teeth. Generally, it may be said that the counting mechanism measures and remembers the amount of angular displacement of the secondary output gear 29. The counting mechanism 13 may be provided to accept any number of revolutions, hence it may be said that the counting mechanism may accept unlimited rotation of the secondary output member.

A feature of the counting mechanism is that the notches 63 of the cams will not again all be aligned until the counting mechanism has completed its counting cycle or the input is reversed to initial index. The illustrated counting mechanism will have a cycle of 100 revolutions before repeating. This counting cycle may be designed to be beyond the limits of the input rotation; therefore, it may be said, for the purposes of a particular mechanism, that the notches 63 will not again be aligned until the counting mechanism is reversed and the secondary output member is returned to its original angular position. When the notches 63 again become aligned, the follower 73 will again be received within the notches to lock the secondary output gear 29 and unlock the primary output shaft 25. The input gear 27 and the shaft 25 are then reoriented in their original relative positions.

It is now apparent that when the primary output member is stopped and the input rotation is diverted to the secondary output member, the secondary output member will accept a limited rotation of the input member. When the input member is reversed, it will drive the secondary output member back to its original position and re-synchronize itself with the primary output member. Hence the mechanism provides for limited overtravel of the input member with respect to the primary output member, and the input member is automatically synchronized with the primary output member when the amount of overtravel is taken up.

The mechanism will accept unlimited input rotation; but where the input rotation exceeds the periodic or cyclic operation of the secondary output, a reversal of input rotation will establish a new synchronization point for the primary output corresponding to the number of periods or cyclic operations of the secondary output.

A feature of the overtravel mechanism is that during the overtravel and return of the input member, the primary output member is locked against rotation in either direciton.

What is claimed is:

1. A synchronizing overtravel mechanism comprising rotational input means, means for differentially coupling said input means to primary and secondary rotational output means, means for alternately locking said primary and said secondary output means against rotation, means normally actuating said locking means to lock said secondary output means, means responsive to a predetermined load on said primary output means to actuate said locking means to lock said primary output means, means for measuring the angular travel of said secondary output means, and means associated with said measuring means for maintaining said locking means in locking engagement with said primary output means while said measuring means registers angular travel of said secondary output means.

2. A synchronizing overtravel mechanism comprising a rotational input member, differential gearing, primary and secondary rotational output members, said gearing dividing the input rotation between primary and secondary rotational output members, means for limiting the amount of rotation of said primary output member, means directly coupled to said secondary output member for measuring the angular displacement thereof, means for locking said measuring means, said measuring means being locked in an indexed position, means responsive to a predetermined load on said primary output member to release said locking means, means responsive to the release of said first named locking means for locking said primary output member against rotation, and means associated with said measuring means for maintaining said primary output member locked against rotation until said measuring means is returned to its indexed position.

3. A synchronizing overtravel mechanism comprising differential gearing, said differential gearing dividing a rotational input between primary and secondary rotational output members, means for limiting the amount of rotation of said primary output member, a revolution counter coupled to said secondary output member, means for locking said secondary output member against rotation, said revolution counter being indexed when said secondary output member is locked, said locking means having means adapted to release in response to a predetermined load on said primary output member means responsive to the release of said first named locking means for locking said primary output member against rotation, and means for maintaining said primary output member locked and said secondary output member unlocked until said revolution counter is returned to its indexed position.

4. A synchronizing overtravel mechanism comprising differential gearing, means coupling said differential gearing to a rotational input, said differential gearing dividing the input driving force between primary and secondary rotational output members, means for limiting the angular displacement of said primary output member, means responsive to said limiting means for selectively locking said primary output member against rotation whereby said input driving force is diverted to said secondary output member, a mechanism coupled to said secondary output member for measuring the angular displacement thereof, means for locking said measuring mechanism whereby said secondary output member is locked against rotation, a single mechanism for alternately actuating said last named locking means and said first named locking means, and means associated with said measuring mechanism for maintaining said primary output member locked against rotation when angular displacement of said secondary output member is indicated.

5. A synchronizing overtravel mechanism comprising differential gearing, means coupling a rotational input member to said differential gearing, means coupling primary and secondary rotational output members to said differential gearing, a pair of mating gears coupled to said primary output member, one of said mating gears having one or more teeth than the other of said gears and each gear having an interference lug, said interference lugs engaging each other after a predetermined number of revolutions of one of said mating gears whereby rotation of said primary output member is stopped, a revolution counter coupled to said secondary output member, said counter comprising a series of cams adapted to be actuated progressively, each of said cams being provided with a notch in its periphery, a locking member including a follower bar for engagement with said cams and adapted to be received in said notches when they are aligned, said locking member including a detent for engagement with one of said mating gears coupled to said primary output member, and means for normally urging said follower bar against said cams and said notches, said detent being engaged with said gear when said follower bar is riding against the peripheries of said cams.

References Cited in the file of this patent
UNITED STATES PATENTS

| | | |
|---|---|---|
| 2,159,915 | Van Wagenen | May 23, 1939 |
| 2,715,998 | Stanley | Aug. 23, 1955 |
| 2,722,379 | Hayek | Nov. 1, 1955 |

FOREIGN PATENTS

| | | |
|---|---|---|
| 506,184 | Germany | Aug. 30, 1930 |